Figure 3:
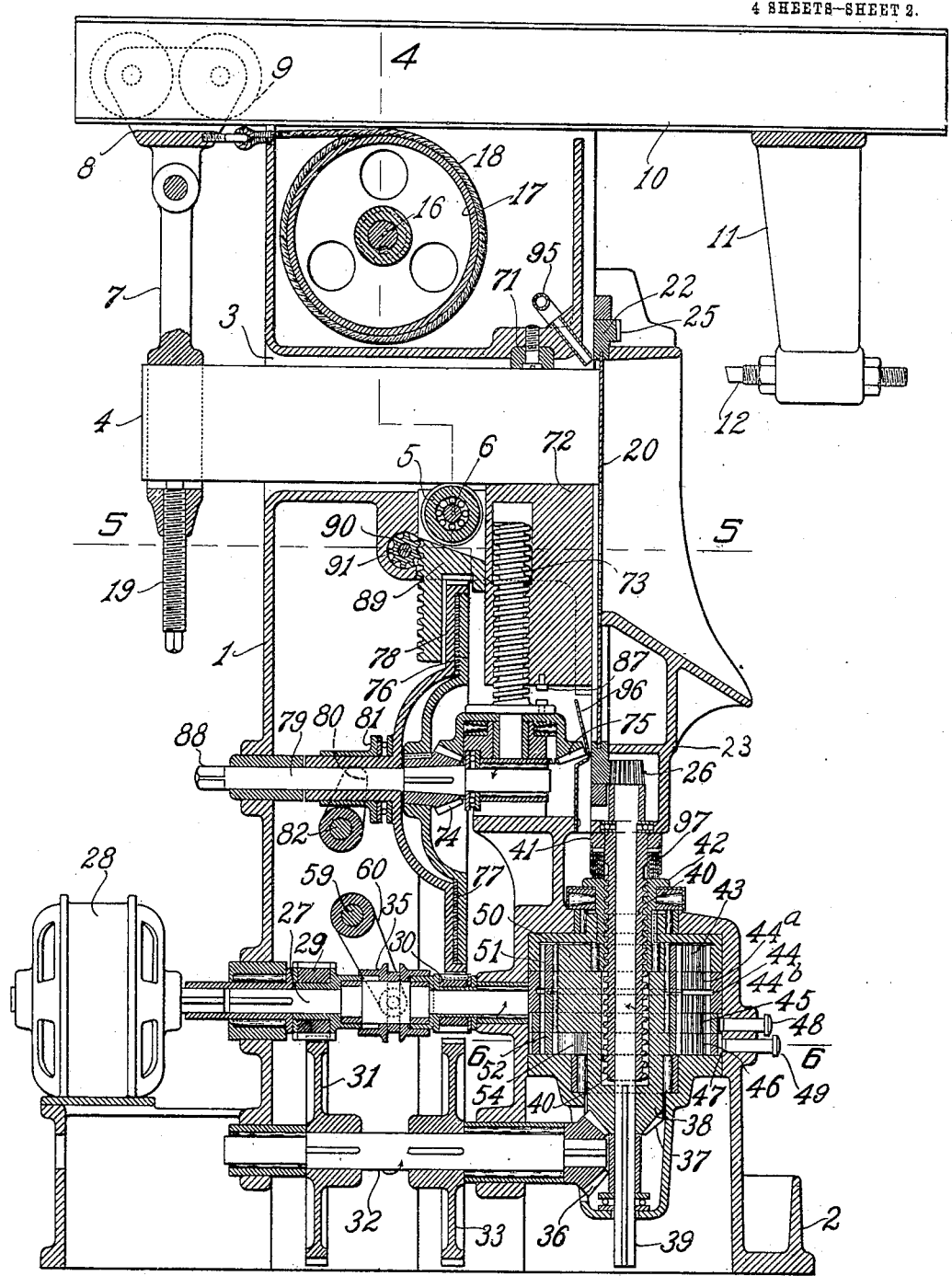

E. B. SELLEW.
AUTOMATIC SAWING MACHINE.
APPLICATION FILED MAR. 18, 1908.
979,102.
Patented Dec. 20, 1910.
4 SHEETS—SHEET 1.
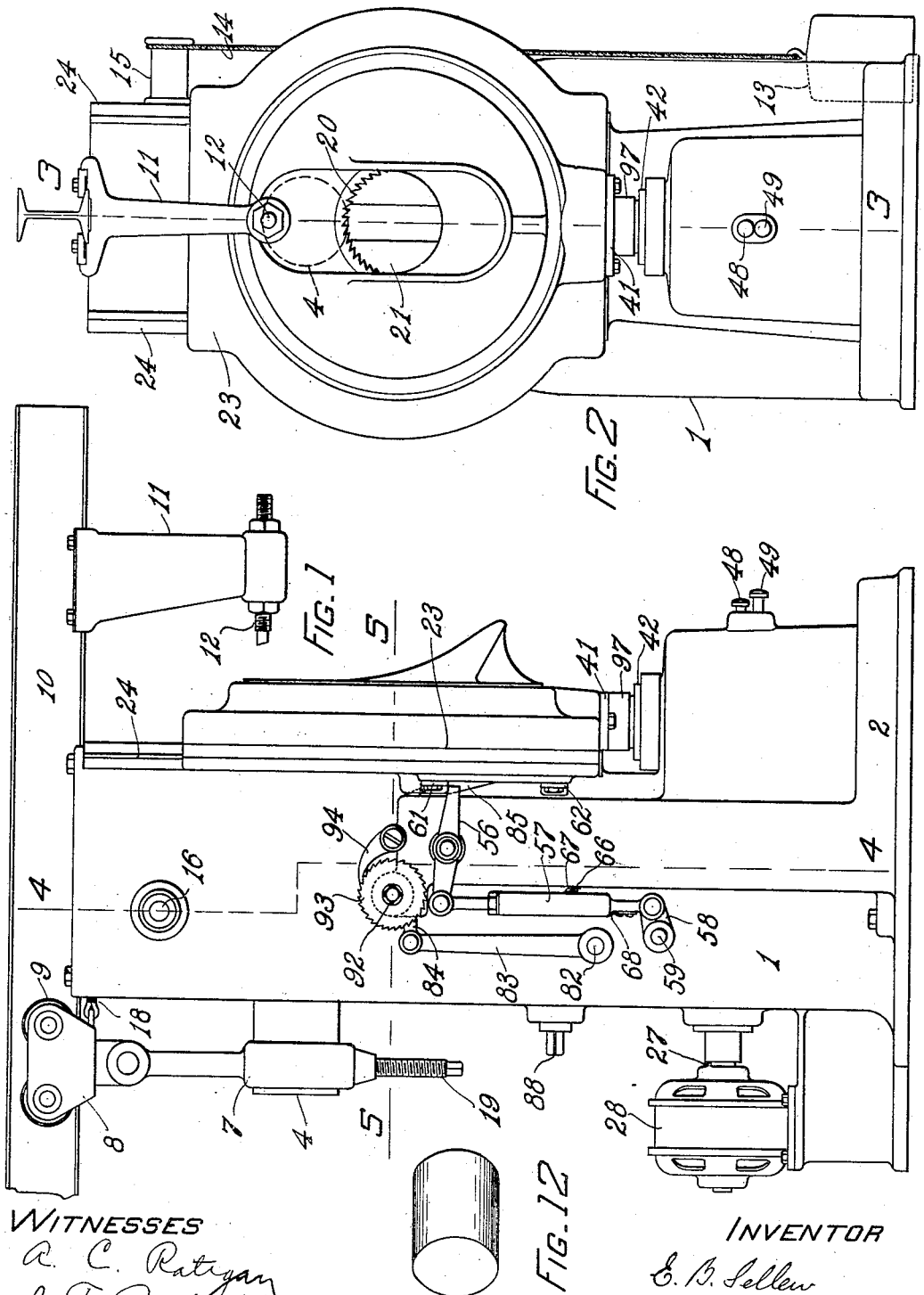
WITNESSES
INVENTOR
E. B. Sellew
By Wright, Brown, Quinby & Ray
Attorneys E. B. SELLEW.
AUTOMATIC SAWING MACHINE.
APPLICATION FILED MAR. 18, 1908.
979,102.
Patented Dec. 20, 1910.
4 SHEETS—SHEET 3.
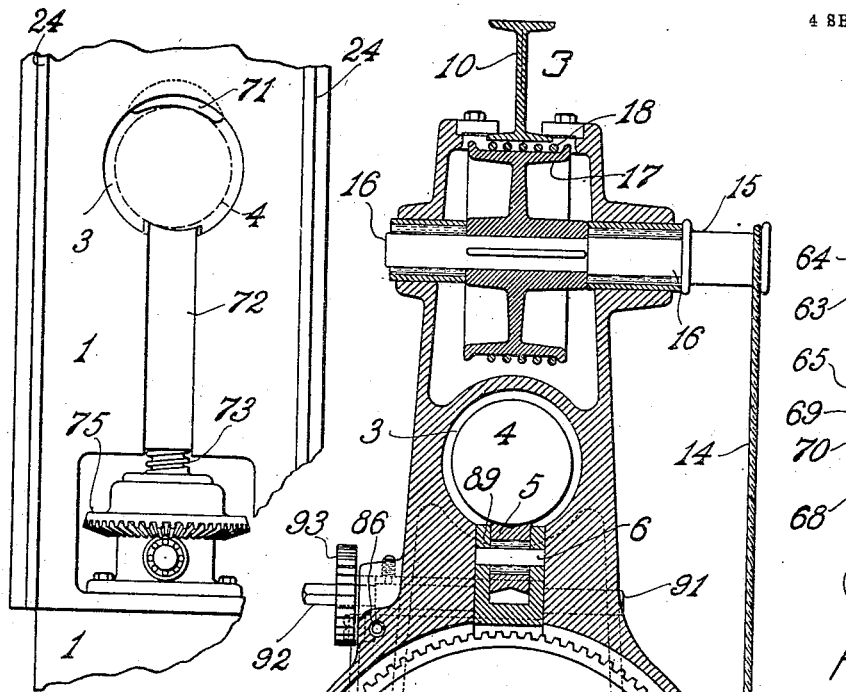
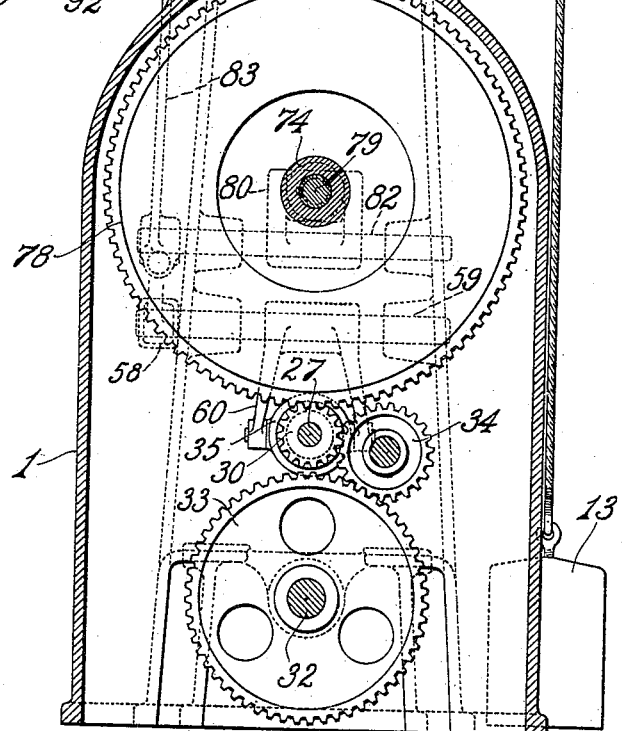
Fig. 10
Fig. 11
Fig. 4
WITNESSES
INVENTOR E. B. SELLEW.
AUTOMATIC SAWING MACHINE.
APPLICATION FILED MAR. 18, 1908.
979,102.
Patented Dec. 20, 1910.
4 SHEETS—SHEET 4.
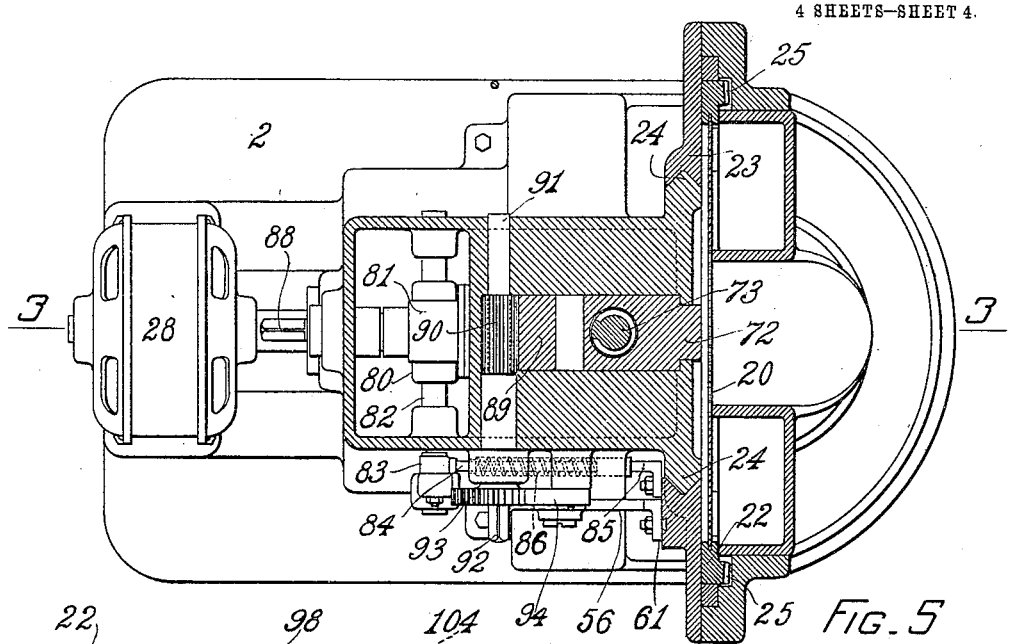
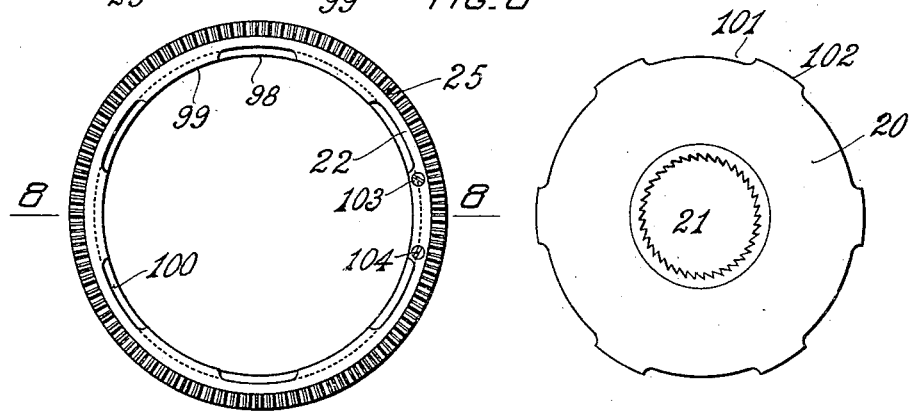
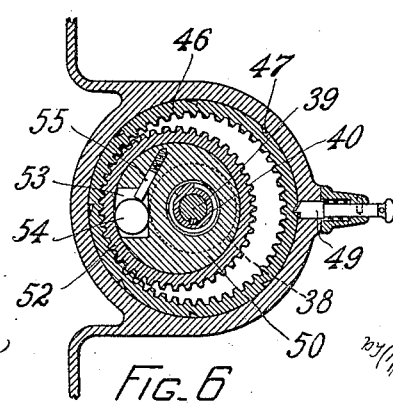
WITNESSES
INVENTOR

UNITED STATES PATENT OFFICE.

ERNEST BURCHARD SELLEW, OF PAWTUCKET, RHODE ISLAND.

AUTOMATIC SAWING-MACHINE.

979,102.　　　　　Specification of Letters Patent.　　Patented Dec. 20, 1910.

Application filed March 18, 1908. Serial No. 421,866.

*To all whom it may concern:*

Be it known that I, ERNEST BURCHARD SELLEW, of Pawtucket, in the county of Providence and State of Rhode Island, have invented certain new and useful Improvements in Automatic Sawing-Machines, of which the following is a specification.

This invention relates to machines for cutting off sections from metal bars.

It has for its primary object to make a completely automatic machine of this character which, without attention on the part of the operator, will feed forward the work after each section has been cut off, and repeat the cutting operation as long as any stock remains.

Another object is to provide an improved slow-speed mechanism for feeding the cutter into the work and so constructing such mechanism that it may return the cutter to starting position at a greatly increased speed.

Other objects are to provide automatic reversing mechanism which will effectually in all cases return the cutter to starting position and throw in the slow-speed feed for a new cut, to provide means whereby the work is fed by gravity after each cut has been completed, and to provide an automatically-operating clamp to secure the work preliminary to the cut being started, and to release it in order to permit further feeding immediately upon completion of the cutting off.

In the accompanying drawings there is illustrated a machine embodying the essential features of my invention.

In said drawings,—Figure 1 represents a side elevation of one such machine. Fig. 2 represents a front elevation as seen from the right of Fig. 1. Fig. 3 represents a vertical central section on line 3—3 of Figs. 2 and 5. Fig. 4 represents a cross-section on line 4—4 of Figs. 1 and 3. Fig. 5 represents a horizontal section and plan view of the parts below the line 5—5 of Figs. 1 and 3. Fig. 6 represents a section of the tool-feeding mechanism taken on line 6—6 of Fig. 3. Fig. 7 represents an elevation of an annular saw-holder. Fig. 8 represents a sectional view of the same on line 8—8 of Fig. 7. Fig. 9 represents an elevation of a form of circular saw used in connection with my invention. Fig. 10 represents an elevation of the work clamp. Fig. 11 represents a sectional elevation of a part of the mechanism by which the reversal of the tool drive and return of the tool to starting position is effected. Fig. 12 represents a perspective view of a section cut by my machine from the work.

The same reference characters indicate the same parts in all the figures.

The machine consists of a columnar casing 1 supported by its base 2 and having a passage 3 through it from front to rear to admit the work 4. The latter is a cylindrical or prismatic bar usually of metal, and of approximately uniform diameter or thickness throughout. It may be of any shape in cross section, whether circular, elliptical or polygonal. That portion of the bar which is contained within the column of the machine is supported by an anti-friction roll 5, which is preferably arranged on a roller bearing surrounding a stud 6, while the outer end is clamped in a traveling holder 7, the latter being suspended from the carriage 8 provided with trolley wheels 9 which rest on the flanges of an I-beam 10. A bracket 11 is adjustably fixed on the I-beam in front of the machine, and has an adjustable stop 12 against which the end of the bar abuts when in position to be operated on. As the drawings show the machine just after the conclusion of one cut, the forward end of the bar is shown as being restrained by the cutter 20, the section which was previously in contact with the stop having been severed and removed. Upon return of the cutter to starting position, the work is automatically fed forward into position for a new cut, by gravity acting upon a weight 13 (see Fig. 2). This weight is suspended by a cord 14 from a drum 15 about which the cord is wound, this drum being on the shaft 16 of a second drum 17 within the frame of the machine about which a rope 18 which is attached to the carriage 8 is wound.

The cutting tool consists preferably of a circular saw 20 shown in detail in Fig. 9. This saw is made from a disk having a central aperture 21 around the rim or boundary of which are formed the cutting teeth. It is secured in an annular holder 22 which is rotatably held in a slide 23, the latter engaging approximately vertical guides 24 on each side of the front of the machine frame. Gear teeth 25 are formed or secured to the saw holder 22 close to its periphery, which are engaged by a pinion 26.

The mechanism for rotating the saw and feeding it into and through the work consists of a shaft 27 which is driven by any suitable means, such as the motor 28 shown in the drawings, or a belt pulley or gearing. This shaft carries two loose pinions 29 and 30 respectively, the former of which meshes directly with a gear 31 on a counter-shaft 32 and the latter of which drives a similar gear 33 on the same shaft through an idler pinion 34. A clutch 35 which is splined to the shaft 27 and movable endwise thereon, connects each pinion alternately with the shaft, and so causes the counter-shaft 32 to be driven alternately in opposite directions. This latter shaft has keyed to it a bevel pinion 36 meshing with a complemental pinion 37 formed on a hub or sleeve 38. Splined within this hub and rotated by it is a shaft 39 which carries the pinion 26 by which the saw 20 is rotated.

The same driving mechanism serves both to rotate the saw and to feed it through the work. For effecting this feed, I provide a screw 40 upon a sleeve which loosely surrounds the shaft 39, this sleeve being secured to the saw-carrying slide 23 by a flange 41 bolted to the lower part of the slide. Meshing with this screw is a nut 42 which is keyed to an internal gear 43. Below this internal gear is an annulus 44 having two sets of internal teeth of different pitches, which annulus is mounted so as to be free to turn, while below the latter are two independent internal gears 45 and 46. Each of the latter has notches 47 in its external periphery which are adapted to be engaged by spring-pressed latches 48 and 49. These notches and latches are beveled so that when the gears are turned in one direction, they will slip by the latches, while their rotation in the opposite direction is prevented. Either latch may be withdrawn and retained out of engagement with its respective gear so that the latter may be free to turn in either direction.

The upper part of the hub or sleeve 38 represented at 50, is eccentric and has rotatably journaled upon it the spur gears 51 and 52. The former of these is of sufficient extent to mesh with both the internal gear 43 and the portion 44ª of the annulus 44, while the second meshes with the toothed part 44ᵇ of this annulus and also with the gears 45 and 46. As the hub is rotated, these gears 51 and 52 are carried revolubly about the axis of rotation, and caused to roll upon the internal gears with which they are in mesh. In order to effect the feeding of the work, one or the other of the gears 45 46 is held stationary. All the internal gears have different numbers of teeth, so that a differential drive of the annular gear 43 and the feed-screw is effected, while the two interchangeable stationary gears 45 and 46 provide means by which the rate of feed may be varied. In order to explain the action of this differential mechanism, the several gears may be considered for example as having the following tooth values:—Gear 43—72 teeth; gear 44ª—73 teeth; gear 44ᵇ—63 teeth; gear 45—62 teeth; gear 46—61 teeth. Supposing now that the gear 45 as shown is held stationary. One revolution of the hub 38 will then cause the annulus 44 to turn through the space of one of its 63 teeth, that is, through 1/63 of a revolution. At the same time the gear section 44ª restraining the free movement of gear 51, has caused the gear 43 to turn in the opposite direction through the space of one of its teeth, or 1/72 of a revolution. The annulus 44 having been given, however, a slight movement in opposition to that of the gear 43, the latter has a resultant motion equal to the difference between 1/63 and 1/72 of a revolution, so that the nut is rotated only once in each 504 revolutions of the hub 38 and drive pinion 26. In case a more rapid feed is desired, the gear 45 is released and 46 held stationary. With this arrangement, the annulus 44 is turned through 2/63 of a revolution. It is to be understood of course that the values of the gears are not necessarily the same as above given, but that these may be of any desired amount to obtain the required rate of feeding.

In order to produce a quick return of the cutter to starting position after the end of each cut, I provide means by which the feed nut may be turned reversely at the same rate of speed as the drive shaft. This means is a clutch that unites the gear 52 to the eccentric hub, and is shown in Fig. 6. As seen in this figure, there is a recess 53 in the hub, which receives a disk 54 bearing against the inner periphery of the gear 52. A spring-pressed plunger 55 tends to hold this disk near one end of the recess. At its middle portion the recess is deep enough to contain the disk without binding, and it is in this position when the mechanism is driven forward, but at its end the recess is shallower and the disk is crowded into this shallow end when the mechanism is reversed. Thereby the gear 52 is clutched to the hub and caused to turn with the latter at the same speed, thus turning the annulus 44, and through the latter and the gear 50, rotating the nut 42 also at the same speed. This action is permitted by the construction of the notches 47 and latch 49 previously described, which allows the gear 46 also to turn. The clutch is altogether automatic in its action, releasing the gear 52 whenever the machine is driven forwardly, and clutching it to the hub as soon as the reverse commences.

An automatic mechanism is provided for effecting the reversal at the end of the cut and again throwing in the slow feed when the saw has been returned to starting position. This consists of a two-armed lever 56 pivoted on the outside of the machine frame and acting through a link 57 upon an arm 58 connected by means of a rock-shaft 59 with an interior arm 60 which is connected to the clutch 35. Two dogs 61 and 62 which are adjustable in position are carried by the cutter slide and act alternately upon the lever 56 to shift the clutch. When the slide is lowered to its fullest extent, the parts are in the position illustrated in the drawings, and the feed drive connected for reversal, and when the slide arrives at its uppermost position, the dog 62 swings the lever so as to depress arm 58 and swing arm 60 to the left, connecting the forward-drive pinion 29 with the shaft 27.

The clutch-shifting mechanism is so constructed as to insure a thorough engagement of the clutch members whenever the movable member is shifted. For this purpose the link 57 is made variable in length, and provided with an elastic yielding element capable of absorbing energy when the cutter slide is moving, and of giving out that energy to shift the clutch after the slide has come to rest. The construction of this link is particularly shown in Fig. 11, from which it will be seen that the link is telescopic, having a sleeve 57$^a$ and a rod 57$^b$. Surrounding the rod and contained within the sleeve is the elastic element, which in this form of the invention is a spring 63 bearing at its ends against movable abutment sleeves 64 and 65. The latter are adapted to bear both against external shoulders on the plunger and internal shoulders in the sleeve, so that whichever way the plunger may move within the sleeve will cause compression of the spring. A stop-pin 66 is screwed into the wall of the machine frame and is engaged by a pin 67 on the link to prevent movement thereof. This pin 67 is slidable transversely of the link, being pressed outward by a spring 68 and retractable by cam surfaces 69 and 70 on the plunger 57$^b$. It will be understood that when the tool slide is rising, the pin 67 is above the stop 66 and below the latter during the reverse movement of the slide. Consequently, the actuation of the clutch is prevented even after the lever 56 is engaged by one of the dogs 61 or 62. Therefore, the plunger 57$^b$ is moved either up or down, compressing the spring and storing up energy, until one of the cam surfaces retracts the pin 67. Then the spring re-acts and shifts the clutch. Enough movement of the plunger is permitted before the sleeve is allowed to move to secure travel of the clutch throughout its full extent of motion, regardless of whether the cutter slide is in motion or stationary.

While the cutter is in operation the work is held against displacement by clamps 71 and 72, the former of which is fixed and the latter movable. The movable clamp is released whenever the saw is raised so as to allow the work to be automatically fed forward as soon as it is cleared by the aperture in the saw. The screw 73 serves to operate this movable clamp, and this screw in turn is driven by a bevel pinion 74 meshing with a pinion 75 secured to the screw. On the hub of pinion 74 is keyed a disk 76 having a frictional facing 77 which engages the adjacent face of a disk 78 which is loosely mounted on the shaft 79 to which the pinion 74 is keyed. This second disk has peripheral gear teeth meshing with the pinion 30 previously described as being on shaft 27 and serving to drive the cutter-operating mechanism. The disk 78 is thus alternately rotated in opposite directions, being driven directly by the pinion 30 when the cutter is returned, and intermediately by the pinion 29 through the gear train 31 33 34 and 30 during the forward feed movement. Ordinarily the disks 76 and 78 are out of contact so that the latter disk rotates idly, but when they are pressed together, the screw 73 is rotated first to release clamp 72 and later to force it against the work. The disks are pressed together by an arm 80 which bears against a sliding sleeve 81 and is secured to a rock-shaft 82. The sleeve travels on the hub of disk 78 and presses against the latter in the direction necessary to force it against disk 76. On the outside of the machine frame an arm 83 is fastened to the rock-shaft 82 and connected to a rod 84 which passes through a guide in the frame to a position where its end can be engaged by a cam 85 carried by the tool slide. A spring 86 (Fig. 5) tends to hold the rod in this position and to maintain the disks in contact. The cam, however, is of such extent that it disengages the disks immediately after the tool carrier has begun its forward feed and the saw has commenced cutting. The disks are not engaged again until the slide has returned almost to its starting position. Then while the cutter drive is still acting reversely, the disks are connected and the clamp released from the bar. The latter is then fed forward the required distance, and as soon as the drive is again reversed and the cutter commences to feed forward, the clamp is forced against the work. This engagement of the work by the clamp takes place before the friction disks are disconnected, and the latter are permitted to slip so as to avoid danger of breaking any of the parts. There is a stop 87 on the lower end of the clamp 72 which arrests its retractive movement before it becomes jammed against the end of the thread on screw 73 in case it should be retracted to that extent before the disks are disengaged. Provision for manually operating the clamp is made by extending the shaft 79 and forming it with a squared end 88 on which a wrench or crank may be placed. Rotation of this of course turns the pinion 74, and thereby the screw. As soon as the clamp 72 has been released, the work rests on the roll 5 previously described. This roll is carried in a slide 89 which has teeth in the form of a rack on one side, which teeth are engaged by a pinion 90 on a shaft 91. The latter extends outside of the machine frame and has a squared end 92 to which a wrench may be applied. It also carries a ratchet wheel 93 with which a pawl 94 coöperates to hold it and the roll in any adjustment.

Oil may be fed to the work through a pipe 95 which discharges at the point where the tool enters the work. The chips are prevented from falling upon the gear 75 by a shield 96, and are also kept from the screw 40 by a telescopic sleeve 97 which surrounds the upper end of the screw and rests upon the nut 42.

I have described the cutting operation as taking place while the saw descends, but it is to be understood that the forward feed may be made in any other direction, that here described being taken simply because with the manner of supporting the work, the cut section would bind upon the saw if the cut were not made from the top.

As shown in Fig. 9, the saw consists of a disk upon which the teeth are formed on its inner periphery. The disk may be of one piece and the teeth formed directly in it, or the teeth may be of a different grade of steel separately fashioned and secured by welding or otherwise to the body of the disk. I also find it convenient to make the teeth on the inside of a narrow ring of hard steel which is fitted to the aperture of the saw disk and welded thereto.

The holder 22 in which the saw disk is secured is a ring having two flanges 98 and 99 which are sufficiently separated to admit the saw disk between them. One of the flanges, as 99, is cut away at a number of points to provide the recesses 100, and the periphery of the saw disk is similarly cut away to provide recesses 101 alternating with projections 102. These projections are capable of entering the recesses 100 of the flange and of then being turned into the space between the flanges to hold the saw. At one side of the holder are screws 103 104 separated just sufficiently to embrace one of the projections 102. After the saw has been inserted between the flanges and turned so as to locate one of the projections between these screws, the latter are turned home and serve to prevent rotation of the saw within the holder.

The hereinbefore described driving and feeding mechanisms may be also applied to driving a saw or other cutting tool having external peripheral or other teeth as well as a saw of the character described with internal cutting elements.

I claim:—

1. A machine for sawing off pieces from metal bars, comprising a work-holder constructed to clamp the work in fixed position, a saw, a holder in which said saw is rotatably mounted and guided to travel in a path transverse to the axis of the saw, a tubular feed screw connected with said holder for giving feed movements thereto, a shaft contained rotatably within said screw and geared to said saw for rotating the same, and a screw- and shaft-operating member surrounding the screw and keyed to the shaft, whereby a positive connection, insuring rotation of the saw whenever the holder is fed, is secured.

2. A machine for sawing off pieces from metal bars, comprising a work-holder constructed to clamp the work in fixed position, a saw, a holder in which said saw is rotatably mounted and guided to travel in a path transverse to the axis of the saw, a tubular feed screw connected with said holder for giving feed movement thereto, a shaft contained rotatably within said screw and geared to said saw for rotating the same, a nut surrounding said screw and held against axial movement, and a driving sleeve connected to operate said nut and having a positive rotation-transmitting connection with said shaft.

3. An automatic sawing-off machine, comprising a saw-holder, a saw carried thereby, mechanism for driving said saw, means for moving said saw-holder to feed the saw through the work, an automatic reversing mechanism for returning the saw when a piece has been severed from the work, means constantly tending to feed the work forward, a clamp for gripping the work and holding it stationary while being operated upon by the saw, a screw for closing and opening said clamp, gearing for operating said screw, a clutch consisting of a member connected to said gearing and a complemental member driven by said saw-feeding mechanism, and connections controlled by the position of said saw-holder for connecting and disconnecting the members of said clutch, and thereby causing the clamp to be released from and reëngaged with the work at the proper times.

4. In a machine for automatically sawing off sections of bars, the combination of a saw, a saw carrier, a single driving element, connections from said driving element to said saw and saw carrier for imparting cutting and feeding movements thereto respectively, means included in said connections for reversing the direction of feed of the saw-carrier and affecting the speed thereof, a work clamp, and a connection from said driving element to said work clamp for actuating the same automatically to release and permit feeding of the work, and to again clamp the work.

5. A sawing-off machine comprising a saw, a saw carrier mounted to travel transversely to the line of action of the saw, and feeding mechanism for giving a slow feed and a quick return movement to said carrier, said means consisting of interengaging screw and nut elements, one of which elements is secured to the carrier and the other of which is mounted to rotate and is held against axial movement, a rotating eccentric driving member, a planetary gear loosely mounted upon said member, means restraining said planetary gear from rotation with the driving member in the feed movement of the saw, a clutch carried by said driving member and arranged to grip and rotate said gear upon reversal of said driving member, and differential gearing between said planetary gear and that one of the screw and nut elements which is mounted to rotate.

6. A saw machine comprising a tool holder mounted to travel, a saw carried rotatably thereby, a drive shaft connected to rotate said saw, a screw engaged with said holder, a nut meshing with said screw and having an internal gear, a second internal gear having a slightly different number of teeth, means for holding the latter stationary, a hub rotated by said drive shaft, and a planetary gear carried eccentrically and rotatably by said hub and meshing with said internal gears, whereby the nut is rotated at a small fraction of the speed of the hub.

7. A saw machine comprising a tool holder mounted to travel, a saw carried rotatably thereby, a drive shaft connected to rotate said saw, a screw engaged with said holder, a nut meshing with said screw and having an internal gear, a second internal gear having a slightly different number of teeth, means for holding the latter stationary when the drive is in the direction necessary to feed the saw for cutting, a hub rotated by said drive shaft, a planetary gear carried eccentrically and rotatably by said hub and meshing with said internal gears, whereby the nut is rotated at a small fraction of the speed of the hub, and a clutch adapted to secure said planetary gear to the hub when the drive is in the opposite direction, whereby the gears and nut are all turned at the speed of the hub to effect a quick return of the saw.

8. A saw machine comprising a tool holder mounted to travel, a saw carried rotatably thereby, a drive shaft connected to rotate said saw, a screw engaged with said holder, a nut meshing with said screw and having an internal gear connected with it, a plurality of loosely mounted additional internal gears beside the same, means for holding one of them stationary, a hub rotated by said drive shaft, and a plurality of gears carried rotatably and revolubly by said hub, one of which meshes with the nut-connected gear and the other with the stationary gear, while both engage the loose internal gear, whereby a speed of rotation is given to the nut which is the difference between two small fractions of that of the drive shaft.

9. In a machine of the character described, tool driving and feeding means, a work clamp, a screw for closing and releasing said clamp, and connections operated by said means for rotating said screw alternately in opposite directions.

10. In a machine of the character described, tool driving and feeding means, a work clamp, and connections operated by said means for closing and releasing said clamp automatically, said connections including a friction clutch which is adapted to slip when the clamp reaches the limits of its travel.

11. In a machine of the character described, a tool carrier, tool driving and feeding means, a work clamp, and connections operated by said means for closing and releasing said clamp automatically, said connections including a friction clutch adapted to slip when the clamp reaches the limits of its travel, and means controlled by said carrier for rendering said clutch alternately operative and inoperative.

12. In a machine of the character described, tool driving and feeding means, work-clamping members arranged to grip the end of the work beside the tool, connections operated by said means for automatically moving one of said members toward and from the other to grip and release the work, a work feeder arranged to support the end of the work remote from the tool and movable toward the tool, and an adjustable anti-friction rest to support and permit feeding of the work when released from said clamping members.

13. In a machine of the character described, a reciprocating tool holder, mechanism for feeding the same, a reversible drive for actuating said mechanism alternately in opposite directions, a shiftable clutch for effecting reversal of the drive, a clutch shifter operated by movements of said tool holder, and connected with said clutch; said shifter including two relatively movable members and an elastic connection between them; a stationary stop, and a movable stop carried by one of said members and adapted to engage said stationary stop and arrest the member by which it is carried while the other member is moved against the resistance of said elastic connection, the latter member having provisions for displacing said movable stop and permitting it to pass said stationary stop.

14. In a machine of the character described, a reciprocating tool holder, mechanism for feeding the same, a reversible drive for actuating said mechanism alternately in opposite directions, a shiftable clutch for effecting reversal of the drive, a clutch shifter including an extensible and contractible link consisting of two telescoping members and an interposed spring, one of which members is operated by movements of said tool holder and the other of which members is connected with said clutch, a pin carried by the second member movable transversely of the path of such member, a stationary stop by which said pin is arrested, and cam means on the first of said members for releasing said pin and permitting clutch-shifting movement of the second member.

In testimony whereof I have affixed my signature, in presence of two witnesses.

ERNEST BURCHARD SELLEW.

Witnesses:
    MITCHELL ADAMS,
    ELVERY LINGARD.